United States Patent
Douaire et al.

(10) Patent No.: US 10,045,543 B2
(45) Date of Patent: Aug. 14, 2018

(54) PROCESS FOR PRODUCING A FOOD BASED ON LEAVENED DOUGH, LEAVENED PUFF PASTRY DOUGH OR PUFF PASTRY DOUGH

(71) Applicant: VAMIX N.V., Ghent (BE)

(72) Inventors: Philippe Douaire, Les Angles (FR); André De Laporte, Izegem (BE)

(73) Assignee: VAMIX N.V., Ghent (BE)

( * ) Notice: Subject to any disclaimer, the term of this patent is extended or adjusted under 35 U.S.C. 154(b) by 0 days.

(21) Appl. No.: 15/115,926

(22) PCT Filed: Feb. 25, 2015

(86) PCT No.: PCT/EP2015/053921
§ 371 (c)(1),
(2) Date: Aug. 2, 2016

(87) PCT Pub. No.: WO2015/128371
PCT Pub. Date: Sep. 3, 2015

(65) Prior Publication Data
US 2017/0164626 A1 Jun. 15, 2017

(30) Foreign Application Priority Data
Feb. 26, 2014 (FR) ..................... 14 51541

(51) Int. Cl.
*A21D 13/16* (2017.01)
*A21D 8/06* (2006.01)
*A21D 6/00* (2006.01)

(52) U.S. Cl.
CPC ............... *A21D 8/06* (2013.01); *A21D 6/001* (2013.01); *A21D 13/16* (2017.01)

(58) Field of Classification Search
CPC .................. A21D 8/02; A21D 13/16
See application file for complete search history.

(56) References Cited

U.S. PATENT DOCUMENTS

| 5,030,466 A | 7/1991 | Kageyama et al. |
| 6,783,782 B1 | 8/2004 | Larsen et al. |

(Continued)

FOREIGN PATENT DOCUMENTS

| EP | 0 305 071 A2 | 3/1989 |
| EP | 0 353 036 A1 | 1/1990 |

(Continued)

OTHER PUBLICATIONS

"Spiced Cardamom Twists". Available online as of May 7, 2009 from https://pinkstripes.wordpress.com. pp. 1-11. (Year: 2009).*

(Continued)

*Primary Examiner* — Jenna A Watts
(74) *Attorney, Agent, or Firm* — Amster, Rothstein & Ebenstein LLP (57) ABSTRACT

The present invention relates to a process for producing a food based on leavened dough, leavened puff pastry dough or puff pastry dough, comprising the following steps: (i) preparing a leavened dough, leavened puff pastry dough or puff pastry dough comprising flour and water, (ii) kneading the dough, (iii) fashioning the dough to obtain the raw food, characterized in that it comprises the following steps: (iv) shaping at least one surface of the raw food in a curved or corrugated shape, preferably in the shape of a single arch, or in the form of multiple, tandemly arranged arches, (v) freezing and/or deep-freezing the raw food in said arch or multiple arch shape. The present invention relates also to frozen or deep-frozen food products based on leavened dough, leavened puff pastry dough or puff pastry dough, produced according to this process, said foods preferably being chosen, among others, from Viennese pastries, croissants, chocolate rolls, breads.

15 Claims, 7 Drawing Sheets

(56) References Cited

U.S. PATENT DOCUMENTS

| | | |
|---|---|---|
| 8,563,064 B1 | 10/2013 | McFarland |
| 2004/0086601 A1 | 5/2004 | Ross et al. |
| 2012/0294985 A1 | 11/2012 | Claxton et al. |
| 2013/0183406 A1 | 7/2013 | Masuda et al. |

FOREIGN PATENT DOCUMENTS

| | | |
|---|---|---|
| EP | 2 526 775 A1 | 11/2012 |
| FR | 2 698 761 A1 | 6/1994 |
| WO | 200035291 A1 | 6/2000 |

OTHER PUBLICATIONS

"Frozen Croissant Baking" The Fresh Loaf. Available online as of Feb. 16, 20111 from www.thefreshloaf.com. pp. 1-11. (Year: 2011).*

PCT International Search Report and Written Opinion dated Jun. 11, 2015 for PCT International Patent Application No. PCT/EP2015/053921, 14 pages.

PCT Notification Concerning Transmittal of International Preliminary Report on Patentability and Written Opinion of the International Searching Authority, dated Jun. 3, 2016 in connection with PCT International Patent Application No. PCT/EP2015/053921, 13 pages.

\* cited by examiner

PROCESS FOR PRODUCING A FOOD BASED ON LEAVENED DOUGH, LEAVENED PUFF PASTRY DOUGH OR PUFF PASTRY DOUGH

CROSS-REFERENCE TO RELATED APPLICATIONS

This application is a U.S. national stage entry under 35 U.S.C. § 371 of PCT International Patent Application No. PCT/EP2015/053921, filed Feb. 25, 2015, which claims priority to French Patent Application No. 1451541, filed Feb. 26, 2014, the contents of which are incorporated herein by reference in their entirety.

TECHNICAL FIELD

The present invention relates to a process for producing a food based on leavened dough, leavened puff pastry dough or puff pastry dough and also to the food prepared according to this process, and in particular to the Viennese pastries (called also Danish pastry.

BACKGROUND

Leavened, leavened puff pastry and puff pastry doughs prove by virtue of the release of carbon dioxide caused by the alcoholic fermentation of the sugars by the yeast, and of the release of water vapour during the baking phase. The proving of these doughs requires for a lengthy period of time (between one and three hours) an expensive proving chamber which consumes large amounts of energy. Furthermore, the fragility of the fresh proven dough limits the manipulation, handling and/or transportation possibilities.

SUMMARY OF THE INVENTION

One of the objectives of the present invention is to offer frozen, deep frozen or baked foods, based on leavened dough, leavened puff pastry dough or puff pastry dough, which have a much more voluminous and more even appearance than the foods obtained according to the prior art processes.

The invention relates to a process for producing foods based on leavened dough, leavened puff pastry dough or puff pastry dough, and also to foods prepared according to this process, and in particular Viennese pastries. The process of the invention comprises a step of forming the food product in a curved shape (in the form of an arch) and, preferably in an ulterior phase, baking the food product in said curved shape in a raised position (up-right position) on a baking support, or in a position allowing the hot air of the oven to circulate around the food product through the canals formed by curves/arches in the dough.

The inventors have discovered, surprisingly, that the shape of the raw food based on leavened dough, leavened puff pastry dough or puff pastry dough, and the positioning thereof during the baking step, are essential elements to the quality of the final product obtained after baking. Indeed, the positioning of the food in a curved shape in a raised (up-right position) position, on one or more support points, preferably in the shape of an arch, or in the form of multiple arches such as in an undulated or corrugated pattern during baking, allows the flow of hot air circulating in the oven to envelop the food through the formed channels/arches, and to penetrate to the heart of the dough more homogeneously (simultaneous penetration above and below the food) even when said product is being placed flat on a baking support, thereby contributing to increasing the volume and to improving the appearance, the evenness and the homogeneity of the final product.

Owing to a better distribution of heat in the product during the baking step, and to a greater heat exchange through the increase in the surface area subjected to the flow of hot air, the baking time is reduced by 2 to 10%, preferably by 2 to 8%, or 5 to 10% depending on the weight of the product, the baking temperature, and the baking equipment, thereby allowing savings in terms of energy and therefore in terms of production cost.

Thus, the first aspect of the present invention is a process for producing a food based on leavened dough, leavened puff pastry dough or puff pastry dough, comprising at least the following steps:

(i) preparing a leavened dough, leavened puff pastry dough or puff pastry dough comprising flour and water,
(ii) kneading the dough,
(iii) fashioning the dough to obtain the raw food, characterized in that it comprises the following steps:
(iv) shaping at least one surface of the raw food in a curved or corrugated shape, preferably in the shape of a single arch, or in the form of multiple, tandemly arranged arches,
(v) freezing and/or deep-freezing the raw food having said arch or multiple arch shape, in order to allow, preferably in an ulterior phase of baking, the flow of hot air circulating in an oven to envelop the food through the channel(s) or arch(es) formed by said arch(es) or corrugated pattern(s) in said surface of the food product and to penetrate in the heart of the dough allowing a more uniform and homogenous baking. In some embodiments, said arch-shaping can be done on both surfaces. For chocolate rolls, shaping only one surface (i.e. the lower surface, contacting the baking support) can be preferred. For croissants, at least the lower surface (the surface contacting the baking support) needs to be shaped as defined herein, while the upper surface can either be flat or shaped as defined herein as well.

Aspect 2. Process according to aspect 1, in which the curved or corrugated surface of the frozen or deep-frozen food comprises at least one support point, preferably at least two or more support points located at the ends of said food, formed by said arch or tandemly arranged arches.

Aspect 3. Process according to aspect 1, wherein said frozen or deep frozen food product has a single rounded arch shape, the height of the curvature being between 0.4 and 10 cm, preferably between 0.5 and 5 cm.

Aspect 4. Process according to aspect 1, in which the corrugated surface of the frozen or deep-frozen food comprises more than two support points, alternating with two or more channels or arches. Said arches hence are tandemly arranged on at least the lower surface of the food, i.e. the side that will be in contact with the baking support.

Aspect 5. Process according to aspect 4, wherein the surface of said frozen or deep frozen food product has tandemly arranged longitudinal channels having dimensions of between 0.4 and 2 cm, preferably of between 0.5 and 1.2 cm, more preferably of about 0.9 cm width and 0.5 cm depth.

Aspect 6. Process according to anyone of aspects 1 to 5, comprising, after step (ii), a step of laminating and a step of folding the dough.

Aspect 7. Process according to anyone of aspects 1 to 6, comprising, after step (ii) and the optional laminating and folding steps, a step of cooling the dough.

Aspect 8. Process according to anyone of aspects 1 to 7, comprising, after step (ii) and the optional laminating, folding and cooling steps, a further step of laminating the dough.

Aspect 9. Process according to aspect 8, in which, at the end of the laminating step, the thickness of the dough is between 0.5 and 3 cm.

Aspect 10. Process according to anyone of aspects 1 to 9, comprising, between steps (ii) and (iii), a step of cutting up the dough.

Aspect 11. Process according to anyone of aspects 1 to 10, comprising, between steps (iii) and (iv), a step of rolling out the raw food.

Aspect 12. Process according to aspect 11, in which, at the end of the rolling out step, the thickness of the raw food is between 5 and 20 mm.

Aspect 13. Process according to anyone of aspects 1 to 3, and 6 to 11, wherein the shaping step (iv) is carried out in a mould with at least one rounded shape, preferably a mould which has multiple tandemly arranged rounded shapes.

Aspect 14. Process according to aspect 13, in which the shaping step (iv) is carried out in a mould with a rounded shape, having a curvature height of between 1 and 10 cm.

Aspect 15. Process according to one of aspects 1, and 4 to 12, wherein the shaping step (iv) is carried out in a mould with an undulated surface enabling the creation of multiple channels separated by tandemly arranged support points in at least one surface of the dough.

Aspect 16. Process according to aspect 15, in which the shaping step (iv) is carried out in a mould with alternating upper and lower ridges having dimensions of between 0.4 and 2 cm, preferably of between 0.5 and 1, 2 cm, more preferably of about 0.9 cm width and 0.5 cm depth.

Aspect 17. Process according to anyone of aspects 1 to 16, in which step (v) is a freezing step carried out at a temperature of between −12° C. and −18° C., preferably for a period of between 30 minutes and 1 hour.

Aspect 18. Process according to anyone of aspects 1 to 17, in which step (v) is a deep-freezing step carried out at a temperature of between −18° C. and −40° C., preferably for a period of between 30 minutes and 1 hour.

Aspect 19. Process according to anyone of aspects 1 to 18, in which step (v) is a freezing step carried out at a temperature of between −12° C. and −18° C., preferably for a period of between 30 minutes and 1 hour, followed by a deep-freezing step carried out at a temperature of between −18° C. and −40° C., preferably for a period of between 30 minutes and 1 hour, or vice versa.

Aspect 20. Process according to anyone of aspects 1, 2, 3, and 6 to 19, comprising after step (v), a step (vi) which comprises in positioning the curved frozen or deep-frozen food on a baking support in a raised (up-right position) position on said at least two support points, in the shape of an arch, and baking the food product.

Aspect 21. Process according to aspect 20, in which the curved frozen or curved deep-frozen food is positioned on the baking support in a raised (up-right position) position in the shape of an arch, either on one support point whereby the convex surface of said food is facing the baking support, or on at least two support points whereby the concave surface of said food is facing the baking support.

Aspect 22. Process according to anyone of aspects 1, and 4 to 19, comprising after step (v), a step (vi) which comprises in positioning the corrugated frozen or deep-frozen food on a baking support on said corrugated surface, the more than two support points contacting the baking support in an undulated manner, and baking the food product.

Aspect 23. Process according to anyone of aspects 20 to 22, in which the oven is a conventional oven or a pulsed air oven, with or without steam.

Aspect 24. Process according to anyone of aspects 20 to 23, in which step (vi) is carried out at a temperature ranging from 140 to 200° C., preferably for a period ranging from 15 to 30 minutes.

Aspect 25. Process according to anyone of aspects 1 to 24, in which the leavened dough, leavened puff pastry or puff pastry dough comprises other ingredients chosen from sugar, salt, gluten, yeast and improvers.

The final food product is prepared through baking said curved or corrugated frozen or deep-frozen food product preferably in the shape of an arch, or having at least one surface that comprises two or more arches, on a flat baking support. Due to the curved shape or due to the surface with multiple curves and multiple support points (also called undulated or corrugated shape) of the dough, channels or arches are formed between the bottom layer (lower surface) of the dough and the baking support allowing the flow of hot air in the oven to envelop the food on the top and lower surfaces during ulterior phase of baking.

It has been observed that the shaping of foods in a curved shape and preferably in the shape of an arch, or having at least one surface that comprises two or more arches, and the positioning thereof in a raised (up-right position) position improves not only the appearance and the evenness of the final products obtained after baking, but also reduces the baking time for said foods, the curved ("arch-" or "multiple arch-") shape allowing uniform baking on the top and bottom of the foods, and penetration of the heat to the heart of said products much more rapidly when they are positioned on one, two or more support points (in the shape of an arch or in the form of two or more arches). In addition, the higher heat of the baking support versus the hot air in the oven is only transferred to the one or more contacting points of the dough, which will reduce the temperature shock. In the prior art processes, dough is contacted with the baking support over its complete lower surface, which results in a temperature shock of said surface. This shock effect is largely reduced in the present invention, due to the shape of the dough, which is only in contact with the backing support in the support points. The remaining parts of the lower surface of the dough is surrounded by and baked by hot air during the initial baking step. This again improves the quality of the end product.

The invention further encompasses the following aspects:

Aspect 26. Frozen or deep-frozen food product based on leavened dough, leavened puff pastry dough or puff pastry dough, produced according to the process of anyone of aspects 1 to 19, said foods preferably being chosen, among others, from Viennese pastries, croissants, chocolate rolls, breads.

Aspect 27. Frozen or deep-frozen food products based on leavened dough, leavened puff pastry dough or puff pastry dough, having an upper and a lower surface, characterised in that at least said lower surface comprises a curved or corrugated shape, preferably the shape of an arch, or two or more arches which are tandemly arranged.

Aspect 28. The food product according to aspect 27, wherein said arch or two or more arches form one or more channel(s) between the baking support and the lower side of the food product, which will allow hot air from the oven to envelope the food product in a more homogeneous manner.

Aspect 29. Frozen or deep-frozen food product according to anyone of aspects 26 to 28, in which the frozen or deep-frozen food comprises at least one support point, and preferably at least two support points located at the ends of said food.

Aspect 30. Frozen or deep-frozen food product according to anyone of aspects 26 to 29, wherein said frozen or deep frozen food product has a rounded shape with the height of the curvature/arch of between 1 and 10 cm, preferably between 2 and 5 cm.

Aspect 31. Frozen or deep-frozen food product according to anyone of aspects 26 to 29, in which the frozen or deep-frozen food comprises more than two support points, alternating with two or more channels or arches.

Aspect 32. Frozen or deep-frozen food product according to aspect 31, wherein at least the lower surface of said frozen or deep frozen food product has tandemly arranged longitudinal channels having dimensions of between 0.4 and 2 cm, preferably of between 0.5 and 1, 2 cm, more preferably of about 0.9 cm width and 0.5 cm depth.

Aspect 33. Baked food product based on leavened dough, leavened puff pastry or puff pastry dough, produced according to the process of any one of aspects 20 to 24, said foods preferably being chosen, among others, from Viennese pastries, croissants, chocolate rolls, breads.

DETAILED DESCRIPTION

For the purposes of the invention, the term "curved shape" is intended to mean a three-dimensional curved shape which may be either rounded or angular. Said curved shape can consist of a single curve, creating an arch such as depicted in FIGS. 1 to 4, comprising either a single support point (FIG. 1), or two support points (FIG. 4), or can comprise multiple arches/curves with multiple support points such as the one depicted in FIGS. 5 to 8, showing a corrugated or wave-based shape (schematically in FIG. 6). Said corrugated shape needs to be applied at least to one surface, preferably the lower surface of the food product (FIG. 8) in order to achieve the effects. It can optionally also be applied to both lower and upper surface of the food product (cf. FIGS. 5 and 7).

The expression "in a raised position" means an "up-right" position of the curved frozen or curved deep-frozen food on a baking support via one, two or more support points, such that the entire surface of the food located facing the support (bottom, or lower surface) is not in direct contact with said baking support, and which allows the hot air in the oven to circulate over the top and underneath the food product. Thus, only said one, two or multiple support point(s) is (are) in direct contact with the baking support. Each of the one or more formed arches or curves in the dough are orientated substantially perpendicular to the plane of the dough and/or the baking support. This is in contrast to e.g. a typical croissant from the prior art, which may also have a curved shape, but wherein the curve is in or parallel to the plane of the dough and/or the baking support. In the food product of the current invention the curves or arches are hence formed in the cross section made from the upper surface towards the lower surface of the dough. Said curves or arches are tandemly arranged in the surface of the dough.

The invention hence also provides a frozen or deep frozen food product based on leavened dough, leavened puff pastry dough or puff pastry dough, having an upper surface (top) and a lower surface (base), wherein at least said lower surface is curved or undulated, i.e. wherein said lower surface has one or more curves and/or contact-points. Said one or more curves are tandemly arranged alongside the cross-section of the dough, forming an undulating profile. Said undulating profile can also be present on the upper surface of the food product. The undulating profile is configured to enable contact of the food product with a baking support only in its contacting points, i.e. at the base of the curves in the profile. The undulating profile is configured to enable the passage of hot air in an oven through channels formed between the tandemly arranged arches and the baking support.

The curved frozen or curved deep-frozen food product may be positioned on said baking support via one support point, its convex surface then being positioned facing the support. The curved frozen or curved deep-frozen food may alternatively be positioned on said baking support via its two support points, and in this case, it is its concave surface which is positioned facing the baking support.

The corrugated frozen or deep-frozen food product is positioned with its corrugated side contacting said baking support in its multiple supporting points only.

Said food product can have one or two curved sides. At least the lower surface, i.e. the surface or side of the dough intended to be in contact with the baking support, should be curved as described herein. In some embodiments, the upper surface of the food product or dough can also be curved, thereby also increasing the surface area in contact with the hot air in the oven and increasing the homogeneity of the final baked product. Typically for croissants, both surfaces of the dough will be curved, while for e.g. chocolate rolls, only the lower surface will generally be curved.

During step (i) of preparing the flour-based leavened dough, leavened puff pastry or puff pastry dough, said dough may comprise other ingredients chosen, for example, from sugar, salt, gluten, yeast, improvers (active compounds which assist the development of the dough), such as enzymes, emulsifiers or ascorbic acid. Trimmings, which correspond to dough offcuts having the same composition as the final dough, may also be added to the preparation.

After the kneading step (ii), the process of the invention may comprise a step of laminating and a step of folding the dough, said dough preferably undergoing, in the case of a leavened puff pastry dough, from 20 to 80 layers, such as from 20 to 60 layers, and more preferably from 20 to 70, preferably from 20 to 30, or from 30 to 70 layers.

After the kneading step (ii) and the optional laminating and folding steps, the process of the invention may also comprise a step of cooling the dough, resulting in hardening of the dough, said cooling preferably being carried out until the temperature of the dough is between 0 and 10° C., and preferably equal to 5° C.

After the kneading step (ii) and the optional laminating, folding and cooling steps, the process of the invention may comprise a further step of laminating the dough.

This laminating step may be progressive laminating, the dough passing between a plurality of pairs of rolls, the space made between the two rolls of one pair being less than the space made between the two rolls of the preceding pair. Preferably, at the end of the laminating step, the thickness of the dough is between 0.2 and 4 cm, and preferably between 1.5 and 2 cm, or between 0.5 and 2 cm.

During the laminating step, and more particularly in the case of leavened puff pastry or puff pastry doughs, a fat may be incorporated into the dough. This step may be carried out on an automatic system with an extruder by forming a laminate structure comprising superimposed layers of dough and of fat. Preferably, the fat is butter or margarine, the amount of butter or of margarine incorporated into the dough representing between 15% and 30%, such as between 20% and 30% by weight of the total weight of the dough. The layers of fat allow the product to develop, carbon dioxide exerting a pressure between the layers.

Advantageously, the laminating step is carried out at a temperature of between 10 and 20° C., and preferably between 12 and 16° C.

The process of the invention may comprise, between steps (iii) and (iv), a step of cutting up the dough. For example, for the preparation of a croissant, the cutting up step is carried out in the shape of a triangle, said croissant then being rolled up on itself to give it the desired shape. Add. Cutting up the dough for the preparation of a chocolate roll+include chocolate bar(s).

According to one advantageous embodiment, the process of the invention may comprise, between steps (iii) and (iv), a step of rolling out the raw product obtained at the end of step (iii), the thickness of the raw food obtained at the end of this rolling out step being between 5 and 20 mm, and preferably between 10 and 20 mm. The rolling out step may be carried out by progressive laminating.

Advantageously, a progressive laminating machine comprising a plurality of pairs of rolls increasingly close together is used for this step. The even development of the raw foods is promoted by symmetrical laminating, for example using guiding means which direct the longitudinal axis of the food parallel to the axes of the laminating rolls.

Preferably, the rolling out step is carried out at a temperature of between 10 and 20° C., and preferably between 12 and 16° C.

According to one particular embodiment, in the case of the production of croissants, the fashioning step (iii) may comprise from 3 to 5 rounds, such as from 4 to 5 rounds.

According to one particularly preferred embodiment, step (iv) of shaping the raw food in a curved or corrugated shape and preferably in the shape of an arch, or in the form of multiple arches, is carried out in a mould with one or more rounded shape(s), the height of the curvature of which is between 0.5 and 10 cm, such as between 1 and 10 cm or 0.4 and 10 cm, and preferably between 2 and 5 cm, such as between 0.5 and 5 cm, depending on the nature of the product. In case of a curved food product, said mould can additionally comprise two edges allowing the formation of the support points. In case of a corrugated food product, said mould encompasses alternating upper and lower longitudinal ridges forming channels in the food product once the dough is pressed into said mould. Said ridges can be rectangular, circular, triangular, etc. In one preferred embodiment, said mould is an undulated or wave-formed mould creating multiple channels in the food product once the dough is pressed into said mould.

During step (v) of freezing and/or deep-freezing the raw food, the temperature is preferably between $-12$ and $-40°$ C., for a period ranging from 30 minutes to 1 hour. Said food product is frozen in its curved or corrugated form and preferably in the shape of an arch, or in the form of multiple arches. It is carried out, for example, in a freezing or deep-freezing tower. This step makes it possible to store the food for periods of between several hours and several months, and also to maintain the curved or corrugated shape of the food product. This step makes it possible to "temporarily" maintain the food in a three-dimensional curved shape and prevents sinking of the food during the first baking phase.

Advantageously, the freezing and/or deep-freezing step (v) may comprise:
  either a freezing step carried out at a temperature of between $-12°$ C. and $-18°$ C., preferably for a period of between 30 minutes and 1 hour,
  or a deep-freezing step carried out at a temperature of between $-18°$ C. and $-40°$ C., preferably for a period of between 30 minutes and 1 hour,
  or a freezing step carried out at a temperature of between $-12°$ C. and $-18°$ C., preferably for a period of between 30 minutes and 1 hour, followed by a deep-freezing step carried out at a temperature of between $-18°$ C. and $-40°$ C., preferably for a period of between 30 minutes and 1 hour, or conversely a deep-freezing step carried out at a temperature of between $-18°$ C. and $-40°$ C., preferably for a period of between 30 minutes and 1 hour, followed by a freezing step carried out at a temperature of between $-12°$ C. and $-18°$ C., preferably for a period of between 30 minutes and 1 hour.

The process of the invention may also comprise a glazing step, preferably carried out with eggs and or eggs with others ingredients. This glazing may be carried out before or after the freezing and/or deep-freezing step (v).

In an additional step (vi), preferably in an ulterior phase, the curved or corrugated frozen or deep-frozen food product can be baked on a baking support. Said step consists in positioning the curved or corrugated frozen or deep-frozen food product on a baking support, whereby only its one or more support point(s) are in direct contact with the baking support. This positioning can be in the shape of an arch or in the shape of multiple arches. The food may be positioned on the baking support in the shape of an arch, either on one support point, the convex surface of said food then facing the support, or on at least two support points, the concave surface of said food then facing the support. If multiple curves are present in the food product such as with a food product having a corrugated or undulated lower and/or upper surface or side, said food product is positioned on the baking support with its support points only, i.e. with its curved surface contacting the baking plate.

The baking support may be a baking tray or the base plate of an oven.

Typically, two baking phases are observed during said step (vi):
- a 1st baking phase, which can represent between ⅕ and ⅓ of the total duration of the baking step, during which the curved or corrugated frozen or deep-frozen food gradually sinks, while the flows of hot air circulate around and penetrate the food on both the upper top and lower side of the food product through the arches or channels, then
- a 2nd baking phase during which the food is baked flat on the baking support (product has sunk to the plate), the total duration of the baking step being depending on the size of the food.

Figure 1:
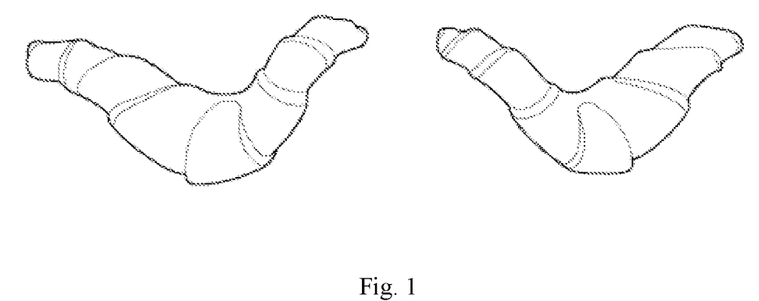
FIG. 1: Depicts two curved croissants according to one embodiment of the current invention, positioned on their convex surface (one support point)
Figure 2:
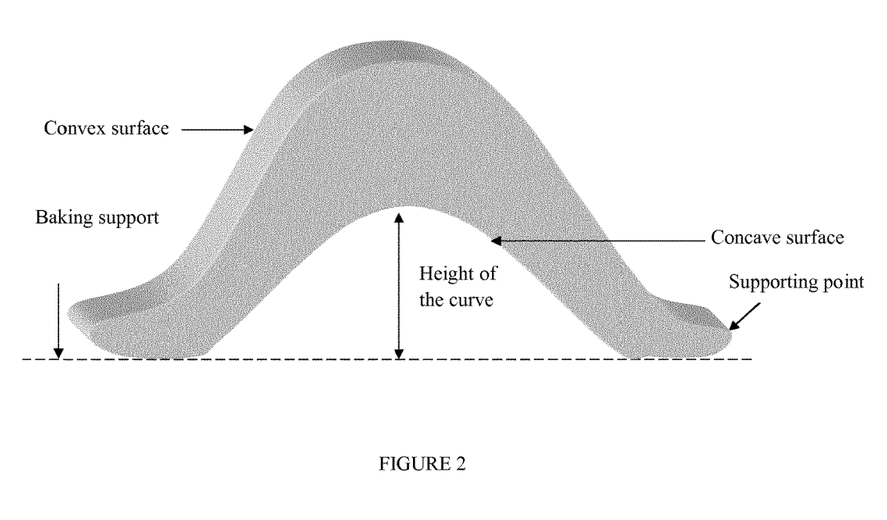
FIG. 2: Shows a schematic representation of the concave and convex surfaces (the double arrow represents the height of curvature)

In the sense meant by the invention, when the convex surface of said curved food product is positioned facing the support, it has a single support point in contact with the baking support (FIG. 1). When the concave surface of said curved food product is positioned facing the baking support, it has at least two support points in contact with the baking support. The concave and convex surfaces are indicated in FIG. 2.

In case of a multiple curve food product, also called a corrugated or undulated food product, each of the longitudinal channels are formed either perpendicular to the long edge of the food product or parallel to the long edge of the food product. In either case, said alternating channels form a passage for the hot air from the oven to pass through and engulf or envelope the food product, resulting in a more homogeneous baking step.

Advantageously, during step (vi), the curved frozen or curved deep-frozen food is positioned in the shape of an arch via at least two support points, the concave surface of said food facing the baking support.

The oven used during step (vi) may be a conventional oven or a pulsed air oven, with or without steam.

According to another preferred embodiment, step (vi)—at an ulterior phase of baking—of baking the curved frozen or curved deep-frozen food is carried out at a temperature ranging from 140 to 200° C., preferably for a period ranging from 15 to 30 minutes.

After the baking, the baked foods thus prepared are ready to be consumed.

Another object of the invention relates to frozen or deep-frozen foods based on leavened dough, leavened puff pastry or puff pastry dough, produced according to the process of the invention, said foods preferably being chosen, among others, from breads.

Said frozen or deep-frozen food products based on leavened dough, leavened puff pastry dough or puff pastry dough, have an upper and a lower side, characterised in that at least the lower side (contacting the baking support) comprises or has a curved or corrugated shape, preferably the shape of an arch, or multiple arches, which are tandemly arranged. Said arch or arches form channels between the baking support and the lower side of the food product, which will allow hot air from the oven to envelope the food product in a more homogeneous manner.

Another object of the invention relates to frozen or deep-frozen Viennese pastries based on leavened dough, leavened puff pastry or puff pastry dough, produced according to the process of the invention, said Viennese pastries preferably being chosen, among others, from croissants or chocolate rolls (pains au chocolat). Said frozen or deep-frozen food products have a curved or corrugated shape and preferably in the shape of an arch, or in the form of multiple arches.

Another object of the invention relates to baked foods based on leavened dough, leavened puff pastry or puff pastry dough, produced according to the process of the invention, said foods preferably being chosen, among others, from breads.

Another object of the invention relates to baked Viennese pastries based on leavened dough, leavened puff pastry or puff pastry dough, produced according to the process of the invention, said Viennese pastries preferably being chosen, among others, from croissants or chocolate rolls (pains au chocolat).

The terms "corrugated" and "undulated" are used as synonyms to describe a multitude of curves in said dough product, and preferably in the shape of an arch, or in the form of multiple arches, hereby forming channels/arches in said dough product allowing hot air in an oven to more evenly be distributed than when compared to a normal food product, which is positioned flat on the baking plate, making contact with the latter over the whole lower surface of the food product.

Any mould, such as a roller, notched belt, cylinder, etc., suitable for use in food production can be used for shaping the dough of the food product. It can have longitudinal ridges can be if any shape, such as of rectangular, circular, triangular, etc. shape, as long as it forms some sort of channel that allows hot air to flow through it. In preferred embodiments, the channels formed have dimensions of between 0.5 and 2 cm, such as between 0.4 and 2 cm, preferably of between 0.7 and 1.2 cm, such as between 0.5 and 1.2 cm, more preferably of about 0.9 cm width and 0.5 cm depth or of about 0.9 cm width and 0.4 cm depth. The food product can e.g. be passed through two rollers or notched belts, creating streaks on the lower and optionally also on the upper side of the dough-based food product. Like this, parallel channels are formed in the dough, with about 0.9 cm in between each channel, curve, or arch. The channels or arches on the upper side (and/or lower side) are tandemly arranged (cf. FIGS. 5 to 7). The channels are typically arranged perpendicular to the great length of the food product and are preferably about 0.5 cm deep and about 0.9 cm wide. These channels or arches ensure the passage of the hot air in the oven to envelope the food product during baking and to penetrate the heart of the dough in a more homogeneous manner.

In addition to the above arrangements, the invention also comprises other arrangements which will emerge from the rest of the description which follows, which refers to an exemplary embodiment of a process according to the invention, and also to the appended FIGS. 1 to 8.

EXAMPLES

Example 1. A Process According to the Invention for Producing Croissants with a Single Arch Dough Preparation 54 l of water are poured into a spiral kneading machine, then 100 kg of flour are added at a temperature of 15° C. 9 kg of sugar, 1.8 kg of salt and 2 kg of gluten are added. 30 kg of trimmings having the same composition are also added to the preparation.

The mixture is kneaded for a period of 4 minutes, and then 8 kg of yeast are added. The mixture is kneaded for a period of 7 minutes, the temperature at the end of kneading being between 10 and 16° C.

The recipe of the dough prepared is given in Table 1 hereinafter.

The dough is then laminated and the fat is incorporated according to conventional methods known to those skilled in the art.

The dough is then cut up into individual parts in the shape of a triangle (base: 110 mm, height: 145 mm) and finally fashioned (4.5 to 5 rounds of fashioning) in the form of croissants.

The croissants thus formed are rolled out by progressive laminating so as to obtain croissants having a thickness of 12 mm.

Shaping and Freezing

The croissants are subsequently placed in a mould with a rounded shape, the height of curvature of which is 3.2 cm, and then glazed with egg.

The croissants are then subjected to a deep-freezing step at a temperature of −30° C. for a period of 45 minutes.

Baking

The deep-frozen croissants are then placed in a conventional oven, their concave surface facing the hearth of the oven, with the flattened ends of the croissants, i.e. the two support points, being positioned on the hearth of the oven (croissants in the shape of an arch), and then baked at a temperature of 170° C. for 20 minutes.

During the beginning of the baking step, the croissants gradually sink due to their support points moving apart. This sinking occurs after the temperature has become uniformly distributed in the body of the product.

The sinking occurs between 4 and 6 minutes after the beginning of baking.

Various baking operations were carried out on products having lower heights of curvature:
- for a height of curvature of 1.5 cm, the sinking time measured is 2 minutes,
- for a height of curvature of 2 cm, the sinking time measured is 3 minutes.

The higher the height of curvature of the deep-frozen product, the longer the sinking time, and therefore the better the heat distribution within the product.

Figure 3:
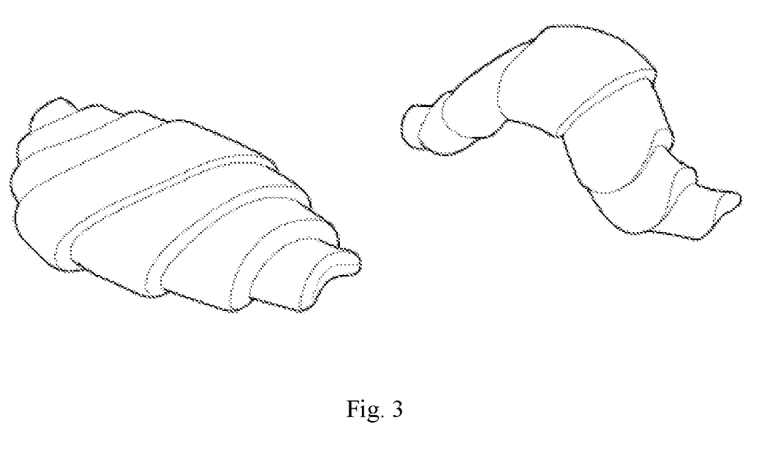
FIG. 3: Shows on the left, a non-curved standard croissant (control) obtained according to a prior art process, on the right, a curved croissant according to one embodiment of the invention, in a (up-right position) position via two support points, its concave surface facing the support.
Figure 4:
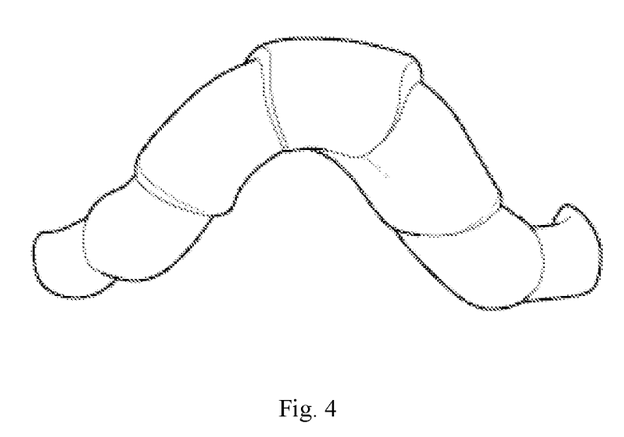
FIG. 4: Shows a curved croissant according to one embodiment of the invention, in a raised (up-right) position via two support points, its concave surface facing the support (height of curvature: 3.2 cm).
Figure 5:
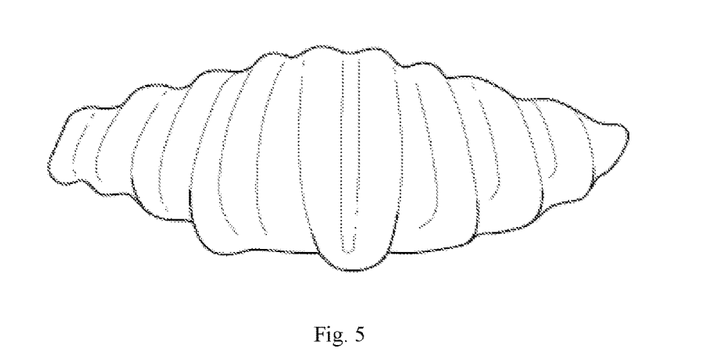
FIG. 5: Shows a photograph of a curved croissant with multiple curves and multiple support points according to one embodiment of the current invention.
Figure 6:
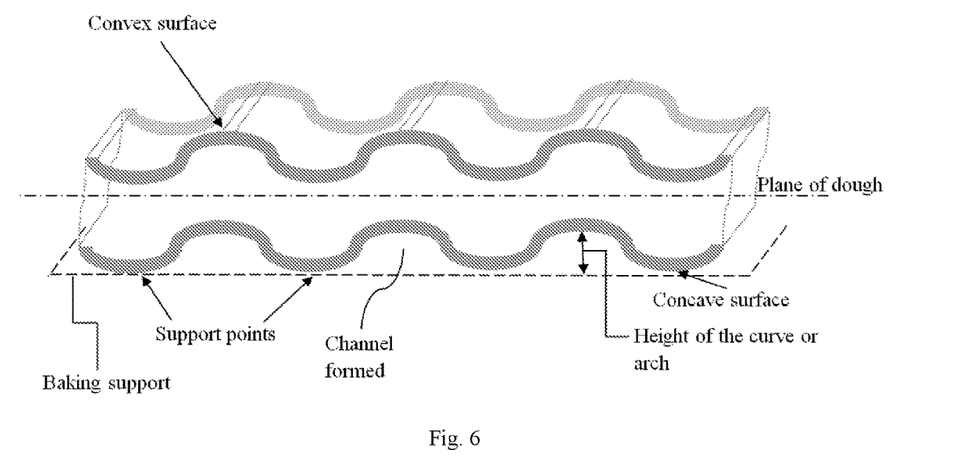
FIG. 6: Shows a schematic view of the dough used for a curved croissant according to one embodiment of the current invention, with multiple curves and multiple support points. Each of the one or more arches are in an up-right position, i.e. are substantially perpendicular to the plane of the dough, and/or the baking support.
Figure 7A:
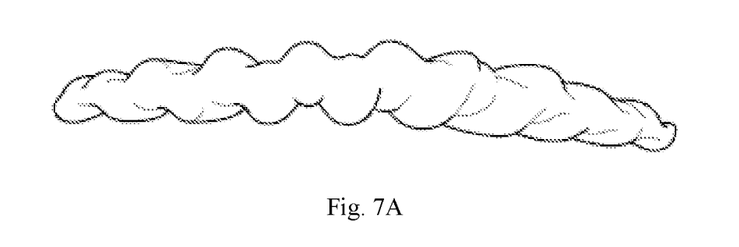
FIG. 7: Shows a photograph of a curved croissant with multiple curves and multiple support points according to one embodiment of the current invention, at both surfaces of the croissant (A). Said croissant is positioned on the baking support via its curved surface (B).
Figure 7B:
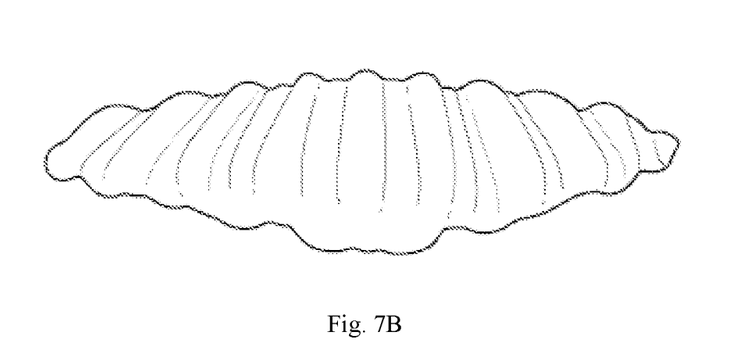
Figure 8A:
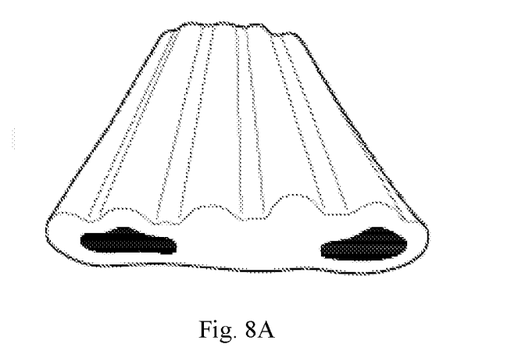
FIG. 8: Shows a photograph of a curved chocolate roll with multiple curves and multiple support points at one side of the chocolate roll (A and B). Said chocolate roll is positioned on the baking support via its curved surface (C).
Figure 8B:
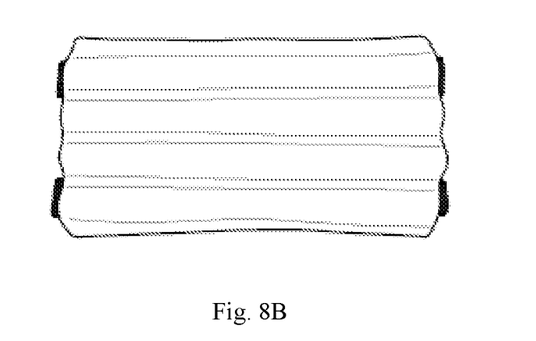
Figure 8C:
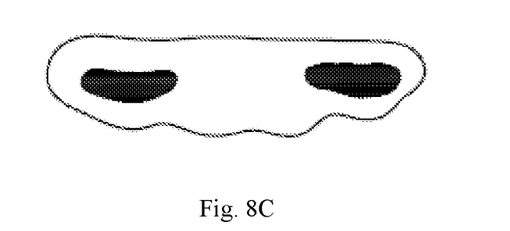

The croissants prepared according to the process of the invention were also compared to (control) non-curved standard croissants having the same composition (cf. FIGS. 3 and 4). The standard croissants are obtained according to a process not comprising a step (iv) of shaping the raw food in a curved shape.

After 7 minutes of baking (that is to say a third of the baking time), the curved croissants prepared according to the process of the invention are much more developed than the control croissants: an increase in the specific volumes of about 5-15% is observed, the volumes being measured using a laser with a Texvol Instruments BVM reader. This increase in volume is confirmed at the end of baking.

A better evenness, and also a better flakiness, of the croissants obtained according to the process of the invention were also observed.

In addition, none of the croissants prepared according to the process of the invention display surface tearing or cracking, whereas the control croissants display between 2 and 8 cracks per product.

TABLE 1

| Ingredients: | RECIPE | Quantity |
|---|---|---|
| Confectionary flour | | 100 kg |
| (W: 290-320; P/L: 0.6; Proteins: 14%) | | |
| (G: 24, according to the CHOPIN standard | | |
| Falling number test: 320, according to the | | |
| Hadberg standard) | | |
| Trimmings | 30 kg | |
| Liquid yeast | 8 kg | |
| Sugar | 9 kg | |
| Salt | 1.8 kg | |
| Improver | 1.3 kg | |
| Gluten | 2 kg | |
| Water | 54 L | |
| Total dough | | 206.10 kg |
| Butter (24% of the dough) | | 49.50 kg |
| TOTAL | | 255.60 kg |

Example 2. A Process According to the Invention for Producing Croissants with Multiple Arches A dough product was prepared as in Example 1. Said dough was then passed through two rollers or notched belts, creating streaks on the lower and upper side of the croissants. In the example, 9 parallel channels were formed in a 60 g croissant, with about 0.9 cm in between each channel/curve/arch. The channels/arches on the upper side the lower side are tandemly arranged (cf. FIGS. 5 to 7). The channels were arranged perpendicular to the great length of the croissant and are about 0.5 cm deep and 0.9 cm wide. These channels/arches ensure the passage of the hot air in the oven to envelope the food product during baking and to penetrate the heart of the dough in a more homogeneous manner.

After a few minutes of baking, the corrugated croissants prepared according to the process of the invention are much more developed than the control croissants: an increase in the specific volumes of about 2-15% is observed, the volumes being measured using a laser with a Texvol Instruments BVM reader. This increase in volume is confirmed at the end of baking.

A better evenness, regularity of shape, and also a better flakiness, of the croissants obtained according to the process of the invention were also observed. In addition, none of the croissants prepared according to the process of the invention display surface tearing or cracking, whereas the control croissants display between 2 and 8 cracks per product.

Example 3. A Process According to the Invention for Producing Chocolate Rolls with Multiple Arches For chocolate rolls, the moulding process was similar except that the channels/arches or curves were formed on one side (the bottom or lower surface) of the roll. The channels/arches or curves were arranged parallel to the long length of the chocolate bread. For a chocolate roll or croissant of 75 g, four channels/arches were present of about 0.5 cm deep and 0.9 cm wide (cf. FIG. 8). Such rolls are formed by cutting bands (e.g. 50-150 cm) of dough and placing 2 (or more) lines of chocolate on said dough. Once solidified, said chocolate lines form chocolate bars.

The dough is then rolled on its own for 2 or 3 times around said chocolate bars, the suture being positioned at the bottom of the roll. The channels/arches are then formed in the bottom or lower surface of the dough and the rolls are frozen or deep-frozen.

Upon baking, said channels/arches ensure the passage of the hot air in the oven to envelope the food product during the ulterior baking phase and to penetrate the heart of the dough in a more homogeneous manner.

After some minutes of baking, the chocolate rolls prepared according to the process of the invention are much more developed than the control rolls: an increase in the specific volumes of about 5-15% is observed, the volumes being measured using a laser with a Texvol Instruments BVM reader. This increase in volume is confirmed at the end of baking.

A better evenness, and also a better flakiness, of the rolls obtained according to the process of the invention were also observed.

The invention claimed is:

1. Frozen or deep-frozen Viennese pastry, croissant, or chocolate roll product composed of leavened puff pastry dough or puff pastry dough comprising flour and water, said product having an upper and a lower surface, characterised in that at least said lower surface is corrugated, resulting in a shape of multiple arches that are separated by multiple support points for contacting a baking support.

2. Frozen or deep-frozen Viennese pastry, croissant, or chocolate roll product according to claim 1, wherein said multiple arches form channel(s) between the baking support and the lower side of the Viennese pastry, croissant, or chocolate roll product.

3. Viennese pastry, croissant, or chocolate roll product according to claim 1, wherein said product has a rounded shape with a height of curvature of between 1 and 10 cm.

4. Process for producing the Viennese pastry, croissant, or chocolate roll product according to claim 1, comprising the following steps:
   (i) preparing a leavened puff pastry dough or puff pastry dough comprising flour and water,
   (ii) kneading the dough,
   (iii) fashioning the dough to obtain a raw food,
   characterized in that it comprises the following steps:
   (iv) shaping at least said lower surface of the raw food in a corrugated shape of multiple arches separated by multiple support points for contacting a baking support, and
   (v) freezing and/or deep-freezing the raw food in said multiple arch shape.

5. Process according to claim 4, comprising, after step (ii), a step of laminating and a step of folding the dough.

6. Process according to claim 4, comprising, after step (ii) and after optional laminating and folding steps, a step of cooling the dough.

7. Process according to claim 4, comprising, after step (ii) and after optional laminating, folding and cooling steps, a further step of laminating the dough.

8. Process according to claim 7, in which, at the end of the laminating step, the thickness of the dough is between 0.5 and 3 cm.

9. Process according to claim 4, comprising, between steps (ii) and (iii), a step of cutting up the dough.

10. Process according to claim 4, comprising, between steps (iii) and (iv), a step of rolling out the raw food.

11. Process according to claim 10, in which, at the end of the rolling out step, the thickness of the raw food is between 5 and 20 mm.

12. Process according to claim 4, wherein the shaping step (iv) is carried out in a mould which has multiple tandemly arranged rounded shapes and a curvature height of between 1 and 10 cm.

13. Process according to claim 4, wherein the shaping step (iv) is carried out in a mould with a corrugated surface enabling the creation of multiple arches separated by tandemly arranged support points in at least one surface of the dough.

14. Process according to claim 4, in which step (v) is a freezing step carried out at a temperature of between −12° C. and −18° C., and/or a deep-freezing step carried out at a temperature of between −18° C. and −40° C., or vice versa.

15. Process according to claim 4, in which the leavened puff pastry or puff pastry dough comprises other ingredients selected from sugar, salt, gluten, yeast and improvers.

* * * * *